(12) United States Patent
Gomez

(10) Patent No.: US 7,025,362 B1
(45) Date of Patent: Apr. 11, 2006

(54) MANUAL LARGE GAME CARRYING DEVICE

(75) Inventor: Matthew Leroy Gomez, Lakewood, CO (US)

(73) Assignee: Matthew L. Gomez, Rock Springs, WY (US)

( * ) Notice: Subject to any disclaimer, the term of this patent is extended or adjusted under 35 U.S.C. 154(b) by 0 days.

(21) Appl. No.: 10/717,423

(22) Filed: Nov. 19, 2003

(51) Int. Cl.
B62B 3/10 (2006.01)

(52) U.S. Cl. ............... 280/47.11; 280/263; 280/63

(58) Field of Classification Search .......... 280/263, 280/264, 267–269, 63, 47.11, 47.131, 47.17, 280/281.1; 482/66, 68
See application file for complete search history.

(56) References Cited

U.S. PATENT DOCUMENTS

| | | | |
|---|---|---|---|
| 89,443 A * | 4/1869 | Smith ............... 280/230 |
| 94,056 A * | 8/1869 | Allen ............... 280/267 |
| 404,562 A * | 6/1889 | Reynolds ............ 280/257 |
| 486,056 A * | 11/1892 | Saladee ............. 280/261 |
| 2,190,779 A * | 2/1940 | Fogle .............. 33/1 H |
| 2,284,333 A * | 5/1942 | McGirl et al. ........ 280/261 |
| 2,992,834 A * | 7/1961 | Tidwell et al. ....... 280/47.3 |
| 3,907,323 A | 9/1975 | Knapp et al. |
| D257,587 S * | 12/1980 | Doyich ............. D34/12 |
| 4,506,902 A * | 3/1985 | Maebe .............. 280/266 |
| 4,934,724 A * | 6/1990 | Allsop et al. ........ 280/281.1 |
| 5,195,394 A * | 3/1993 | Latta .............. 74/551.8 |
| 5,328,192 A | 7/1994 | Thompson |
| 5,645,292 A * | 7/1997 | McWilliams et al. .... 280/494 |
| 5,897,131 A | 4/1999 | Brown et al. |
| 6,341,787 B1 * | 1/2002 | Mason .............. 280/47.26 |
| 2001/0004148 A1 | 6/2001 | Darling, III |
| 2003/0080538 A1 | 5/2003 | Watts et al. |

* cited by examiner

Primary Examiner—Jeff Restifo

(57) ABSTRACT

A manual large game carrying device of the type having an substantially elongated upper receiving bar (30) that accommodates and secures large game at points of securement (32). The manual large game carrying device can be turned by a handlebar configuration (22) which engages a front fork axle assembly (20) at the frame/front fork/handlebar junction (44). This front fork axle assembly (20) is connected to the front rotatable wheel (10A) by the releasable front axle (12). In addition, the manual large game carrying device's speed is controlled by braking mechanism levers (26). The braking mechanism levers (26) engage the braking mechanism linkages (28) which engage the braking mechanisms (42) attached to the front brake rotor (16) and rear brake rotor (18). In addition to steering and stopping the manual large game carrying device, the handlebar configuration (22) has handle grips (24) conveniently placed for efficient transport.

2 Claims, 4 Drawing Sheets

MANUAL LARGE GAME CARRYING DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVETION—FIELD OF THE INVENTION

This invention relates to large game carrying devices, specifically to such large game carrying devices used for transporting large game from the hunting area to the parking or hunt camp area.

BACKGROUND OF THE INVENTION

Since many large game hunters hunt alone, it is essential to find a means to which a solitary hunter can efficiently and quickly remove slain game from the hunting area. Many times these solitary hunters must carry slain large game great distances to either a parking area or campsite before transportation to either home or another destination. Many times assistance is needed for transporting large slain game thus causing the solitary hunter to walk long distances in order to locate help. This problem has been partially solved by the implementation of various types of large game carrying devices, but these have had and still have significant problems.

To solve these problems, inventors have created many types of large game carrying devices to aid in the transport of slain large game from the hunting area. U.S. Pat. No. 5,897,131 to Brown-Brown-Cochran-Reinstein (1999) discloses a complex large game carrying device that transports large game; however, this type of large game carrying device is particularly complicated to assemble and utilizes extraneous parts. These extraneous parts include detachable transport handles, container sections, tensioned cables and ground supportable wheels all inter-fitted and connected by either transverse hinges (container section) or fasteners (transport handles, wheels). Thus, if any element necessary for the construction and operation of this type of large game carrying device is lost, forgotten, or damaged this type of large game carrying device would be rendered useless in the hunting field. Also, being constructed of relatively numerous inter-fitted and connectable parts, Brown-Brown-Cochran-Reinstein's large game carrying device cannot be quickly or easily constructed. Also, Brown-Brown-Cochran-Reinsten's large game carrying device cannot be easily maneuvered with loaded large game due to its extremely unbalanced nature when loaded and transported over irregular surfaces. This is due to the fact that its wheelbarrow carriage type design is inadequate for narrow trails, sloped surfaces, and other obstacles often found in remote hunting areas.

U.S. Pat. No. 5,328,192 to Thompson (1994) shows a manual pull-type large game carrying device that has a complex adjustable mobile carriage, a slidably mounted towing handle and a pair of movably-supportable axle assemblies held together by self-locking pins. Thus, if the locking pins or any other connectable part essential to the construction and operation of this type of large game carrying device is lost, forgotten, or damaged, this type of large game carrying device would also be rendered useless in the hunting field. Being constructed of relatively numerous connectable parts, Thompson's large game carrying device cannot be quickly and easily constructed. Thompson's large game carrying device also cannot be easily transported due to its unbalanced nature when loaded and transported over irregular surfaces. These factors inhibit the transportation of the loaded large game carrying device over sloped surfaces, narrow trails, and rough terrain found in remote hunting areas.

Although the collapsible, ground-supportable, manual transport carrier and the manual pull-type carrier can be used to transport large game from the hunting area, they simply do not possess the critical design elements essential for ease of use when transporting large game great distances on narrow trails and rugged terrain. Also, if any fastener, self-locking pin or connectable part used on these types of large game carrying devices is either lost, damaged, misplaced, or forgotten, these types of large game carrying devices would be rendered useless to the hunter in the hunting field.

Another type of large game carrying device has been proposed—for example, in patent 3,907,323 to Knapp—Knapp (1975) consists of a design that conforms to the familiar types of large game carrying devices already known in the prior art. Basically, this type of large game carrying device is comprised of a carriage, adjustable handles and a single rotatable wheel that supports the large game carrying device. This type of large game carrying device is essentially impossible for a solitary hunter to assemble, load, balance and transport quickly and efficiently over rough terrain, single trails, and sloped surfaces. Also, using set screws to secure adjustments is another disadvantage to this design because these set screws could possibly be misplaced, lost, or forgotten rendering this type of large game carrying device useless to the hunter in the hunting field.

Basically, all large game carrying devices conform to a familiar, expected, and obvious structural configuration encompassed by all prior art and the previous patents stated. Each of these large game carrying devices have been devised and utilized for the purpose of transporting large game. Each of these designs also possess shortcomings inherent to each evident by the excessive number of components used in their construction such as set screws, bolts, nuts, self-locking pins and fasteners. These excessive number of components cause construction time to be time consuming and difficult and can possibly render the large game carrying device useless if any of these components were either misplaced, lost, or forgotten. Also, in order to provide the requisite strength needed for each large game carrying device, relatively thick or large parts could be used in their construction rendering the large game carrying device heavier or larger than necessary (often the case). These disadvantages are just some of the many faced by a hunter using any of these types of large game carrying devices.

The fact that many collapsible large game carrying devices as shown by prior art have many of the shortcomings previously stated, stresses the fact that these types of large game carrying devices are inconvenient to assemble and use. This is due to the fact that a relatively high degree of coordination is needed to construct these large game carrying devices as well as a high degree of care taken to not lose any excessive component or damage any extraneous part.

Nevertheless, all large game carrying devices heretofore suffer from a number of disadvantages:

(a) Their manufacture consists of some designs particularly adapted for use by two persons. These persons steady the large game carrying device, lift the large game carrying device, and steer the large game carrying device together. When loaded, these types of large game carrying devices tend to be overly unbalanced due to the loaded weight not sitting over the center of gravity of the device. For this reason more than one person is needed to load and operate this type of large game carrying device. During transport of this type of device, these persons are constantly counteracting the movement of the loaded weight and quite possibly the overcompensation of the other person against the loaded weight. This happens in cases where the opposite person is stronger and he/she lifts, pulls, or pushes the loaded large game carrying device faster than that person's counterpart increasing the overall work done for each. Essentially, this type of large game carrying device has many shortcomings evidently seen and not including additional shortcomings of extraneous parts needed before proper construction and operation can occur.

(b) If a solitary hunter has access only to a large game carrying device that is particularly adapted for use by two people, this type of large game carrying device would be useless to aid in the transportation of large game. If any extraneous part is lost or damaged upon arrival to the hunting area, this type of large game carrying device would be rendered useless.

(c) Collapsible large game carrying devices are particularly complicated to assemble and use. If the large game carrying device is not assembled properly with each extraneous part being securely attached to the large game carrying device with self-locking pins, nuts, bolts, etc., the large game carrying device would be particularly complicated to assemble and use, if at all. Thus, if any extraneous part or securing component is misplaced, lost, forgotten, or damaged during transport of the large game carrying device to and from the hunting area, this type of large game carrying device would be rendered useless.

(d) Some large game carrying devices utilize parts in their construction that are adjustably connected to the large game carrying device. These adjustably connected parts such as towing arms could possibly be bent or damaged in such a way that the adjustable part would not move as needed. This possibility could either render the large game carrying device particularly hard to operate or render the large game carrying device useless.

(e) Large game carrying devices presented in the prior art are constructed mainly of an excessive number of components including screws, bolts, nuts, self-locking pins, fasteners, etc. Thus, if any of these extra components are misplaced, lost, forgotten, or damaged in any way, the large game carrying device would not be properly constructed if constructed at all.

(f) Prior art large game carrying devices mostly consist of a wheelbarrow or carriage type design that is operated by manually pulling or pushing the large game carrying device. With these types of designs, the manual pulling and pushing forces exerted on the loaded large game carrying device is also accompanied by a lifting force on the loaded large game carrying device. This lifting force is applied to the loaded large game carrying device during transport and increases the work done by the hunter. This additional work force causes the hunter to fatigue quickly and rest more often and for longer periods of time. This is a huge disadvantage to the hunter if quickness is a necessity due to weather or other common variables faced in remote hunting areas.

(g) In prior art large game carrying devices, wheel placement and design does not conform to what is needed for the rugged terrain faced by the hunter day to day. More often than not, large game is taken in an area where game trails or very narrow trails are the only means to transport slain large game from the hunting area. These trails are usually in areas with severely sloped hills, fallen trees, boulders, and small streams all which must be navigated by the hunter and his/her large game carrying device. These trails are rarely-if-never wide enough to accommodate the two and four wheel versions of conventional prior art large game carrying devices. Thus the hunter has to be able to pull, push, steer, and balance these large game carrying devices while traversing rugged terrain and narrow trails.

These narrow trails, whether game trails or not cause prior art large game carrying devices to have additional shortcomings evident when the hunter is transporting large game from the hunting area. Additional shortcomings consist of wheel size being too small to successfully maneuver over boulders, logs, and root systems, as well as corresponding wheel bases that can't accommodate trail width whereby throwing an already unbalanced large game carrying device even more off balance, exponentially increasing the work done by the hunter.

(h) Prior art large game carrying devices have shortcomings when it comes to transporting a loaded large game carrying device on a sloped surface. The center of gravity of loaded prior art large game carrying devices cannot be adjusted to compensate for the unbalanced nature of the device. Thus, the hunter must constantly work to balance the already unbalanced large game carrying device to prevent the device from tipping. Thus the work exerted by the hunter exponentially increases on these sloped surfaces which increases even more if obstacles such as boulders or logs must be navigated.

(i) Prior art large game carrying devices also have shortcomings when it comes to maneuvering the large game carrying device over some fallen trees and some boulders. More often than not the design of prior art large game carrying devices can't accommodate the need to roll over such obstacles. This is due to the fact that these designs have wheels that are too small and are inconveniently attached to the large game carrying device. These designs in turn cause balance troubles, trail accommodation troubles, and ease of use troubles.

BACKGROUND OF INVENTION—OBECTS AND ADVANTAGES

Accordingly, several objects and advantages of my present invention are:

(a) to provide a large game carrying device that can be conveniently used by a solitary hunter without the need of assistance by a second hunter;

(b) to provide a large game carrying device that has a center of gravity that is not skewed or altered to any side or area when loaded, but resides directly over the frame;

(c) to provide a large game carrying device that is not collapsible or constructed of parts that are removably attached and secured by excessive components such as screws, nuts, bolts, self-locking pins, etc.;

(d) to provide a large game carrying device that does not have adjustments provided to change the size, height, or length of the large game carrying device before proper operation;
(e) to provide a large game carrying device that does not require a lifting force while transporting the loaded large game carrying device from the hunting area;
(f) to provide a large game carrying device that can maneuver over game trails, narrow trails, sloped surfaces, and rugged terrain with relative ease due to its wheel configuration and design;
(g) to provide a large game carrying device that is useful in any situation such as sloped surfaces without having to worry about counter-balancing a skewed center of gravity;
(h) to provide a large game carrying device that allows the hunter to adjust the loaded large game carrying device's center of gravity rather than fight the constantly unbalanced designs of prior art large game carrying devices;
(i) to provide a large game carrying device that can maneuver over or around larger obstacles such as some fallen logs and some boulders with relative ease whereas prior art large game carrying devices would not be able to maneuver over or around such obstacles;
(j) to provide a large game carrying device that can be conveniently and easily transported to the hunting area in either a truck or a camping trailer without the loss of a lot of space;
(k) to provide a large game carrying device that takes up minimal space when transported in either a truck or camping trailer;
(l) to provide a large game carrying device that can be quickly and efficiently loaded by a solitary hunter;
(m) to provide a large game carrying device that can quickly and efficiently secure large game to the large game carrying device; and
(n) to provide a large game carrying device that quickly and efficiently loads and transports large game from the hunting area to the final destination.

Further objects and advantages are to provide a large game carrying device that can be used quickly and conveniently by a solitary hunter, that allows this solitary hunter to quickly and efficiently load large game on the device, that allows this solitary hunter to quickly and efficiently secure large game to the large game carrying device, that allows this solitary hunter to maneuver quickly and efficiently on sloped surfaces while not having to fight skewed balance issues, that allows this solitary hunter to maneuver the loaded large game carrying device over larger obstacles with relative ease, that allows this solitary hunter to travel on game trails and narrow trails with great ease due to its linear wheel alignment, that allows this solitary hunter to have complete control of how fast the loaded large game carrying device travels due to its convenient and efficient braking devices, that allows this hunter easy maneuverability in tight areas due to its ability of easy turning, that allows this solitary hunter to go over obstacles such as some fallen logs and some boulders due to its large wheels.

My design is exceptional for its easy turning, efficient braking, good balance, and easy loading, all conveniently done by a solitary hunter. This design also allows for a loss of minimal space during transport in his/her truck or camper to the hunting area camp or parking area. Still further objects and advantages will become apparent from a consideration of the ensuing description and drawings.

SUMMARY

In accordance with the present invention, a manual large game carrying device comprised of an upright rigid frame, rotatable wheels mounted there-under, a controllably stoppable braking means that engages these rotatable wheels, a turning means such as a handlebar configuration that engages the front rotatable wheel and turns the manual large game carrying device, and a securement means that secures large game to the substantially elongated upper receiving bar by a plurality of structurally attached points of securement.

DRAWINGS—FIGURES

DRAWINGS—REFERENCE NUMERALS

Figure 1:
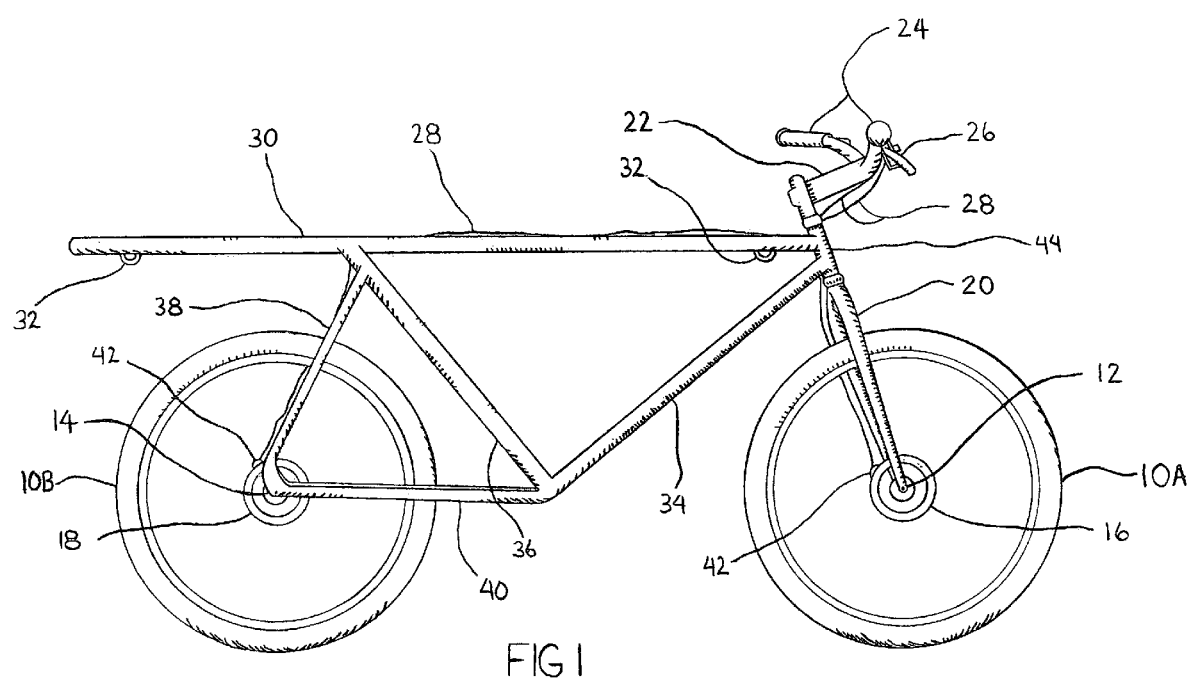
FIG. 1 shows a side view of the manual large game carrying device.

10A front wheel
10B rear wheel
12 releasable front axle
14 releasable rear axle
16 front brake rotor
18 rear brake rotor
20. front fork axle assembly
22 handlebar configuration
24 handle grips
26 braking mechanism levers
28 braking mechanism linkages
30. substantially elongated upper receiving bar
32. points of securement
34 front angled frame bar
36 rear angled frame bar
38 upper rear connecting arms
40 lower rear connecting arms
42 braking mechanism
44 frame/front fork/handlebar junction
46 tie down apparatus

DETAILED DESCRIPTION OF THE PREFERRED EMBODIMENT

Figure 2:
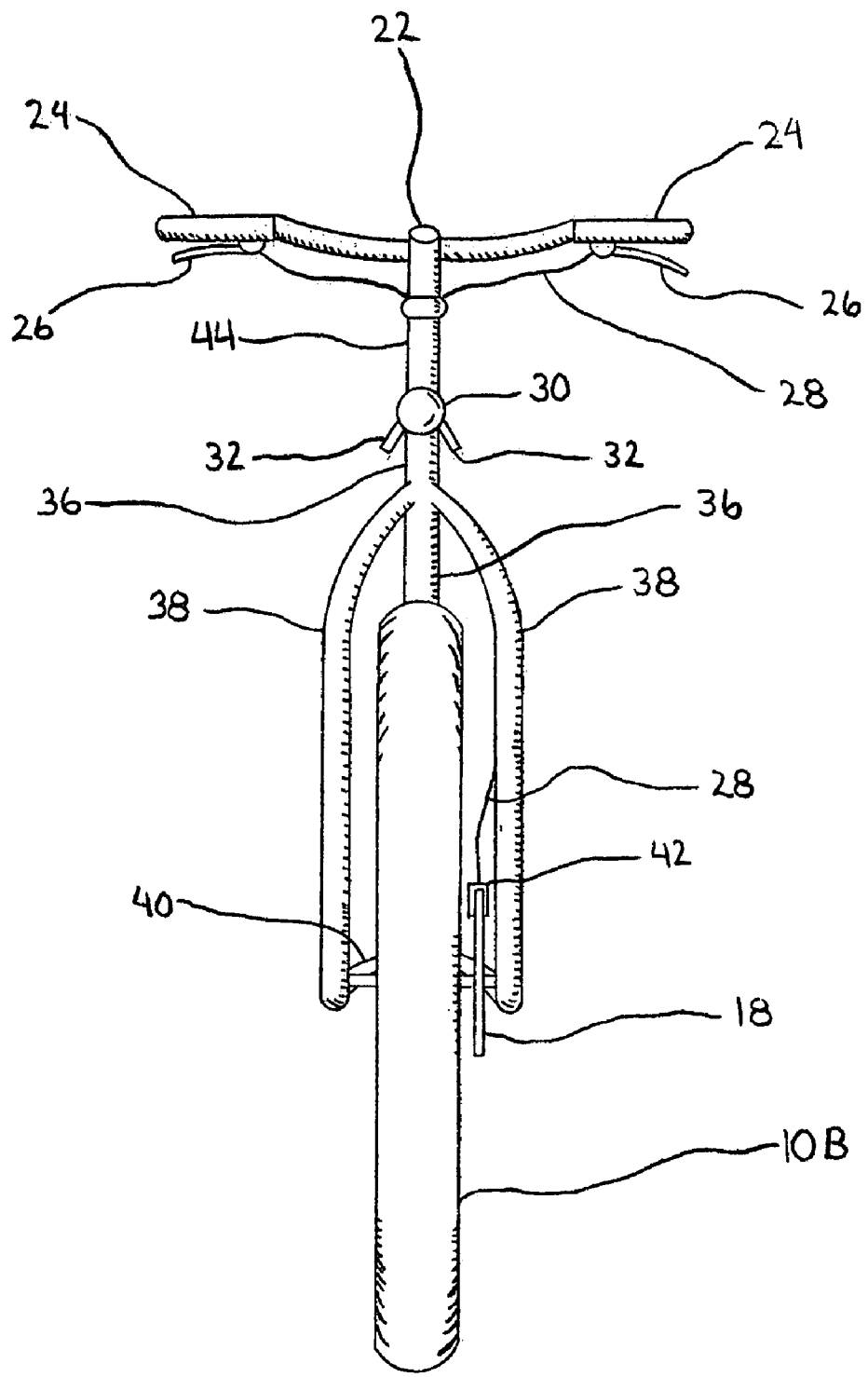
FIG. 2 shows a rear view of the manual large game carrying device.
Figure 3:
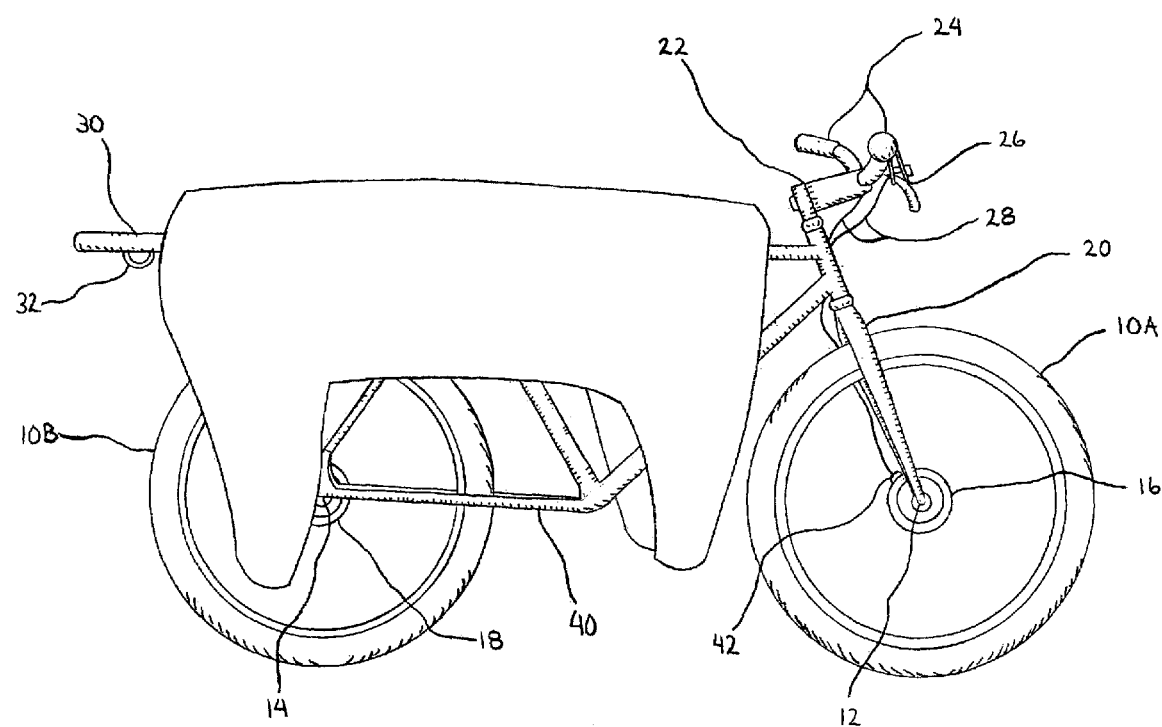
FIG. 3 shows a side view of the manual large game carrying device with loaded large game. This shows how the large game will rest on the substantially elongated upper receiving bar with equal weight distributed on each side of the manual large game carrying device.
Figure 4:
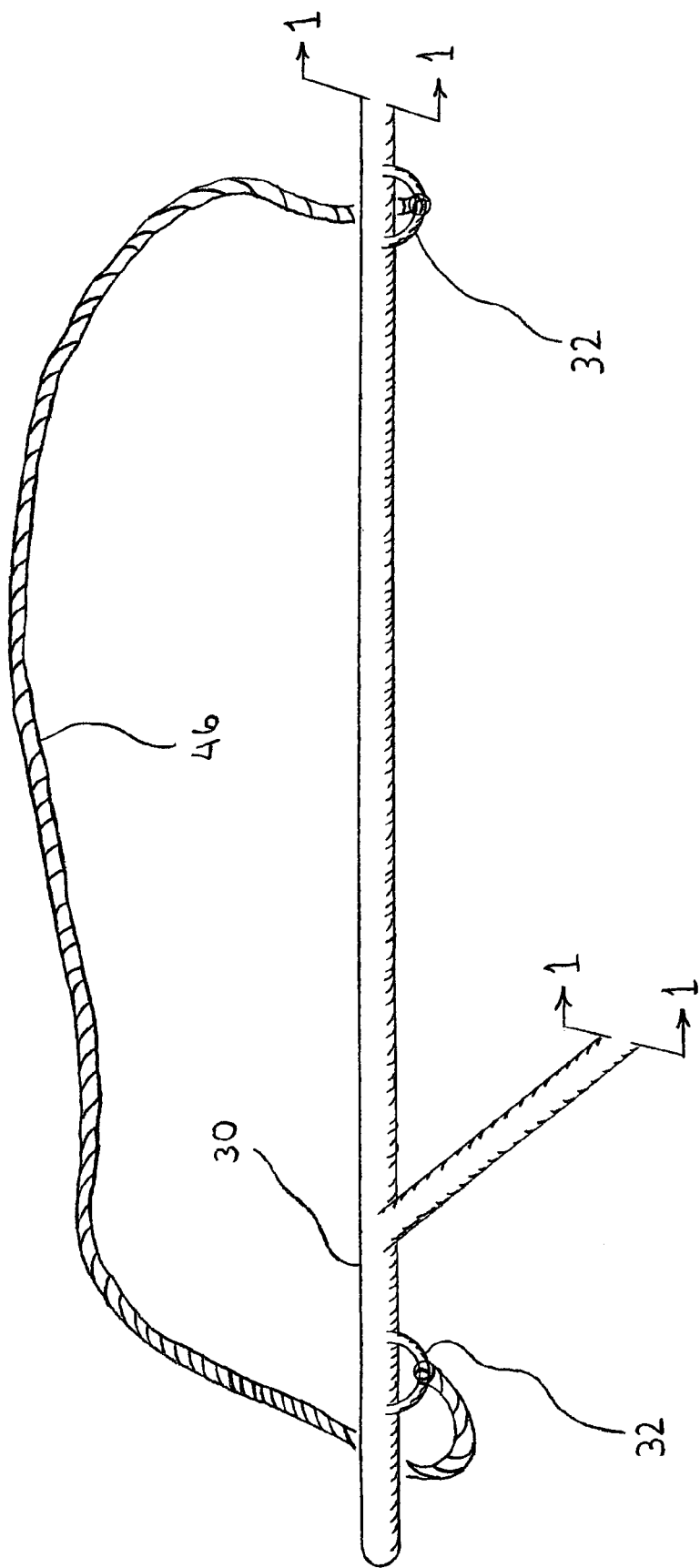
FIG. 4 shows the tie down apparatus used to secure large game to the manual large game carrying device.

A preferred embodiment of the manual large game carrying device of the present invention is illustrated in FIG. 1 (side view), FIG. 2 (rear view), and FIG. 3 (game loaded side view) and FIG. 4 (tie down apparatus). The manual large game carrying device has a solid rigid frame that consists of a substantially elongated upper receiving bar 30, an attached angled frame bar 34 and an attached rear angled frame bar 36. To secure large game to the manual large game carrying device, points of securement 32 are attached to the substantially elongated upper receiving bar 30 to allow quick and efficient securing of large game to the manual large game carrying device. To steer or turn the manual large game carrying device, a handlebar configuration 22 is attached to the rigid frame at the frame/front fork/handlebar junction 44. This handlebar configuration 22 turns the front fork axle assembly 20 that is attached to the front wheel 10A by a releasable front axle 12 thus turning the front wheel 10A and turning the manual large game carrying device. To secure the rear wheel 10B to the manual large game carrying device, upper rear connecting arms 38 and lower rear connecting arms 40 are attached to the rear angled frame bar 36 and are attached to the rear releasable axle 14 that attaches to the rear wheel 10B. Both the front wheel 10A and rear wheel 10B are connected to the rigid frame of the manual large game carrying device by a releasable front axle 12 and a releasable rear axle 14. The releasable rear axle 14 is attached to the rear wheel 10B and both the upper rear connecting arms 38 and lower rear connecting arms 40. The releasable front axle 12 is attached to the front wheel 10A and the front fork axle assembly 20. Attached to the handlebar configuration 22 are handle grips 24 that the hunter places his/her hands on to operate the manual large game carrying device. Also attached to the handlebar configuration 22 are the braking mechanism levers 26 that control the speed of the loaded or unloaded manual large game carrying device. These braking mechanism levers 26 control the speed of the manual large game carrying device by engaging the braking mechanisms 42 that apply pressure to both the front brake rotor 16 and rear brake rotor 18. These braking mechanisms 42 are controlled by the braking mechanism levers 26 by braking mechanism linkages 28 that connect the two. These braking mechanism linkages 28 allow the hunter to control how much stopping pressure is applied to the braking mechanisms 42 by the braking mechanism levers 26. These components are what comprise the simple but very effective manual large game carrying device.

Operation—FIGS. 1, 2, 3, 4

The manner of using the manual large game carrying device to transport large game to and from the hunting area accomplishes what previously predictable large game carrying devices have done but in a completely new and extraordinary way. Namely, to load this manual large game carrying device the hunter will push the bicycle style large game carrying device to the hunting area where the large game kill is. Upon arrival to the hunting area, the field dressed large game is put into a position that will receive the substantially elongated upper receiving bar 30 readily. The manual large game carrying device is placed on its side so the substantially elongated upper receiving bar 30 is slid into the field dressed large game. Once positioned, the manual large game carrying device the substantially elongated upper receiving bar 30 is inserted into the body cavity of the field dressed large game. The substantially elongated upper receiving bar 30 is inserted into the void of the field dressed large game until the upper rigid frame receiving bar 30 rests snugly against the spine of the field dressed large game. Once the manual large game carrying device is positioned properly, tie down apparatus' are used to secure the field dressed large game to the substantially elongated upper receiving bar 30. This is done by attaching the ends of the tie down apparatus to both the front and rear points of securement 32. These points of securement 32 are attached to the substantially elongated upper receiving bar 30.

Once the field dressed large game is securely braced to the manual large game carrying device, the hunter can then position him or herself to upright the now loaded and secured bicycle style large game carrying device. To do this, the hunter grasps the handlebar configuration 22 and engages the braking mechanism levers 26 fully to keep the manual large game carrying device from moving in any way. This process locks both the front wheel 10A and rear wheel 10B of the manual large game carrying device. This is essential to prohibit the movement of the manual large game carrying device while up-righting the now loaded manual large game carrying device. Once the manual large game carrying device is up-righted, the hunter can then transport the loaded bicycle style large game carrying device from the hunting area.

During transport from the hunting area, the hunter has control over how fast the loaded manual large game carrying device will travel over sloped surfaces, down hills, and over obstacles as well as the ability to completely stop the bicycle style large game carrying device. This control is due to the fact that the hunter is pushing the manual large game carrying device at the handlebar configuration 22. This handlebar configuration 22 has the braking mechanism levers 26 attached that allows the hunter to have control on how much braking pressure is applied and how fast or slow the manual large game carrying device. If the hunter feels the loaded manual large game carrying device is moving too fast or could change direction by possibly rolling backwards, all he or she would have to do would be to depress the braking mechanism levers 26. This would then engage the braking mechanism linkages 28 and engage the braking mechanisms 42 attached to both the front wheel 10A and rear wheel 10B.

Since the hunter stands directly to the side of the loaded manual large game carrying device during transport, the bicycle style large game carrying device is not awkward to operate or keep in balance at all since equal weight is distributed along each side of the upper rigid frame receiving bar 30. This design not only allows the hunter to have control over how much braking is used, but also the extreme advantage of not having to lift any part of the manual large game carrying device during transportation. Since the weight distribution is equal on both sides, the hunter does not have to battle balance woes when transporting this manual large game carrying device.

The design and placement of the front wheel 10A and rear wheel 10B of this manual large game carrying device allows the hunter to maneuver the loaded bicycle style large game carrying device on narrow trails and in areas void of any trails. This manual large game carrying device allows the hunter to travel through heavily wooded areas, rock strewn areas, and sage brush strewn areas all without having to fight balance or braking issues and allows the hunter to traverse over some fallen logs, some boulders, and over or through most rugged terrain.

Advantages

From the description above, a number of advantages of my manual large game carrying device have become evident:

(a) This design being free of any attachable extraneous part such as transport handles, locking arms, adjustable handles, and towing arms cannot be rendered useless to a hunter as prior art large game carrying devices are when these parts are lost, damaged, stolen, or forgotten.

(b) This design does not have to be assembled with excessive components such as bolts, screws, nuts and self-locking pins upon arrival to the hunting area.

(c) This design is free of any of the excessive components such as bolts, screws, nuts and self-locking pins.

(d) This design can travel in remote areas on single game trails, narrow trails, or no trails at all due to its linear wheel configuration and design.

(e) Weight distribution is equal on each side of the manual large game carrying device thus keeping the large game carrying device balanced along its center axis.

(f) From the operating standpoint, this design allows the hunter to have complete control on how much braking is applied to either the front or rear wheels or both at the same time.

(g) This design allows the hunter to easily load the manual large game carrying device quickly and efficiently without the need of assistance.

(h) This design allows a hunter to easily secure large game to the manual large game carrying device by conveniently placed points of securement structurally attached to the substantially elongated upper receiving bar.

(i) This design can be easily operated by one person.

(j) This design can be easily operated by two people as well as one, with each person applying a pushing force on each side of the loaded manual large game carrying device.

(k) This stops the manual large game carrying device completely or allows the wheels to roll slowly, or freely.

(l) This design can be easily maneuvered by one person between various obstacles such as tight trails and narrow boulders.

(m) This design allows a solitary hunter to have excellent control over how fast the loaded manual large game carrying device will travel down hill and over different obstacles.

(n) This manual large game carrying device is designed to be extremely resilient and durable to withstand the harsh demands required to successfully extricate large game from remote hunting areas.

(o) This design allows the manual large game carrying device to be transported easily in a vehicle or camping trailer.

(p) This design does not require excess manufacturing of extraneous parts and excessive components.

(q) This design is extremely strong and durable and can withstand the abuses inherent when extricating large game from remote hunting areas.

It is evident from what is shown that my bicycle style large game carrying device has all of the advantages over the previous proposed large game carrying devices and possesses none of their shortcomings.

CONCLUSIONS, RAMIFICATIONS, AND SCOPE

Accordingly, the reader will see that my manual large game carrying device proposed can be used quickly and efficiently to remove large game from remote hunting areas over rugged terrain. This can be done easily by either one hunter as well as two. This new manual large game carrying device can also be quickly and efficiently loaded and secured to the substantially elongated upper receiving bar by one hunter as well as two hunters. In addition, upon up-righting the loaded manual large carrying device, the hunter can then push the device from the hunting area conveniently while not having the additional work prevalent in all other designs. This allows the hunter less strain on the body and extreme decreases in overall work done when transporting large game from the hunting field, especially in steep rugged terrain. Having complete control on how fast the manual large game carrying device travels is also a huge advantage for the hunter, especially when traveling over steep and rugged terrain.

With the large game carrying devices on the market today, during transport of the loaded devices the hunter encounters extreme balancing efforts that must be compensated for, especially on steep and rugged terrain and narrow trails. This unbalance is extremely enhanced when large game is loaded and secured to an already hard to balance device. When loaded, these large game carrying devices have the weight of the large game distributed unevenly on the device. This skewed weight to one area or another greatly enhances the already unbalanced effect, dramatically increasing the work done during transport. This is evident during transport when the loaded large game shifts on these styles of large game carrying devices. This shift of weight in turn greatly increases the work he/she has to do to successfully extricate his/her large game. It is evident that these conventional large game carrying devices have many shortcomings by design evident by the additional work needed during transport. The lifting forces and extreme balancing efforts are a few of the shortcomings that make extrication of large game much more difficult for the hunter in rugged and remote terrain.

Furthermore, my bicycle style large game carrying device has the additional advantages in that:

It allows the solitary hunter to quickly and efficiently remove large game from the hunting area.

It gives two hunters the ability to operate the manual large game carrying device as easily as it is for one.

There is no assembly required consisting of transport handles, locking arms, adjustable handles, towing arms or removable axles.

It does not contain or use any excessive components such as nuts, bolts, locking pins, screws, etc. that could be easily misplaced, lost, forgotten or damaged.

It allows large game to be easily loaded onto the manual large game carrying device.

It allows the large game to be easily secured when loaded by conveniently placed points of securement.

It provides a thoroughly resilient design that will stand up to the harshest demands and harshest climates.

It provides the ability to easily maneuver on game trails, narrow trails, no trails, over some boulders and logs, on steep terrain and over or around any obstacle found in remote and rugged hunting areas.

It provides a design that allows the hunter to walk next to the manual large game carrying device and have complete control on how fast the device will travel over any terrain.

It provides a design that eliminates any lifting force during transport of the manual large game carrying device, greatly decreasing overall work exerted by the hunter.

Although the description above contains many specificity's, these should not be taken as limiting the scope of the invention but as merely providing illustrations of the presently preferred embodiment of this invention. For example, the manual large game carrying device can have an additional feature that would support the device such as a collapsible kickstand mechanism that could stabilize the device when loaded or not loaded. An additional example is a different braking configuration that does not consist of the braking mechanism rotor combination I have illustrated. Another example could be the placement of additional mounts on the substantially elongated upper receiving bar that would allow the attachment of various articles such as canoes, rafts, or backboards. Another example could be the placement of mounts on the rigid frame that would allow the attachment of articles such as a scabbard and pouch combination that would allow the hunter to transport all the equipment he/she uses such as rifles, knives, etc. so she/he does not have to carry these articles during transport.

I claim:

1. A method of loading and transporting large game, comprising:
  a) providing a manual large game carrying device comprising an upright rigid frame having a plurality of rotatable wheels mounted there-under, a means for stopping or slowing said plurality of rotatable wheels, a means for steering said manual large game carrying device and a plurality of points of securement structurally attached to a substantially elongated upper receiving bar on said upright rigid frame, b) providing a large game carcass having a body cavity and inserting said substantially elongated upper receiving bar of said upright rigid frame of said manual large game carrying device in said large game carcass' body cavity until it rests securely on an interior spine of said large game carcass' body cavity, c) securing said large game carcass to said substantially elongated upper receiving bar of said upright rigid frame of said manual large game carrying device by using a tie down apparatus that secures said large game carcass to said plurality of points of securement structurally attached to said substantially elongated upper receiving bar of said upright rigid frame of said manual large game carrying device, and d) raising said manual large game carrying device with said large game carcass securely attached to said substantially elongated upper receiving bar of said upright rigid frame at said plurality of points of securement with said tie down apparatus on said manual large game carrying device for quick and efficient transport.

2. The method of claim 1 wherein said upright rigid frame is constructed of a predetermined material.

\* \* \* \* \*